US012693239B2

(12) United States Patent
Reimann et al.

(10) Patent No.: US 12,693,239 B2
(45) Date of Patent: Jul. 28, 2026

(54) ADAPTATION OF ILLUMINATION SETTINGS FOR OPTICAL MEASUREMENT AND INSPECTION SYSTEMS

(71) Applicant: HEXAGON INNOVATION HUB GMBH, Heerbrugg (CH)

(72) Inventors: Bernd Reimann, Heerbrugg (CH); Fabian Braun, Diepoldsau (CH); Alexandre Heili, Altstätten (CH); Michael Zapp, Saarlouis (DE)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 38 days.

(21) Appl. No.: 18/974,017

(22) Filed: Dec. 9, 2024

(65) Prior Publication Data

US 2025/0198947 A1     Jun. 19, 2025

(30) Foreign Application Priority Data

Dec. 13, 2023     (EP) .................................... 23216374

(51) Int. Cl.
*G01N 21/95* (2006.01)
*G01N 21/88* (2006.01)
*H05B 47/165* (2020.01)

(52) U.S. Cl.
CPC ..... *G01N 21/9515* (2013.01); *G01N 21/8806* (2013.01); *G01N 21/8851* (2013.01); (Continued)

(58) Field of Classification Search
CPC ........... G01N 21/9515; G01N 21/8806; G01N 21/8851; G01N 2021/8835; (Continued)

(56) References Cited

U.S. PATENT DOCUMENTS 8,077,307 B2 * 12/2011 Pertzov .............. G01N 21/8806
382/152
10,887,500 B2 * 1/2021 Wu ........................ G06T 7/0004
(Continued)

FOREIGN PATENT DOCUMENTS

WO      2021/173637 A1     9/2021

OTHER PUBLICATIONS

Leontaris, L. et al., "An Autonomous Illumination System for Vehicle Documentation Based on Deep Reinforcement Learning," IEEE Access, vol. 9, pp. 75336-75348 (2021).
(Continued)

*Primary Examiner* — Seung C Sohn
(74) *Attorney, Agent, or Firm* — Maschoff Brennan

(57) ABSTRACT

A method for optical inspection of a feature of interest on a workpiece using an optical measuring system comprising at least one camera and a plurality of light sources, the method comprising: simulating illumination of a workpiece model; training, based on synthetic images obtained from the simulated illumination, an AI agent or an ML model to automatically control the plurality of light sources; inferring, in at least one image captured by the at least one camera, properties of the feature of interest on the workpiece; the trained AI agent controlling the plurality of light sources to select a light setting for illuminating the feature of interest; and optically inspecting the illuminated feature of interest while it is illuminated with the selected light setting.

17 Claims, 7 Drawing Sheets

(52) U.S. Cl.
   CPC ... *H05B 47/165* (2020.01); *G01N 2021/8835* (2013.01); *G01N 2201/0694* (2013.01)

(58) Field of Classification Search
   CPC ........... G01N 2201/0694; G01N 21/01; G01N 21/84; G01N 2021/0112; H05B 47/165; G06T 2207/20081; G06T 2207/20084; G06T 2207/30164; G06T 7/0004; G06T 17/00; G01B 11/02; G01B 11/08; G01B 11/24; G01B 11/002; G01B 11/00; G06N 3/0499; G06N 3/092; G06V 10/14; G06V 10/25; G06V 10/40; G06V 10/82
   See application file for complete search history.

(56)                   References Cited

U.S. PATENT DOCUMENTS

| | | |
|---|---|---|
| 2019/0184570 A1 | 6/2019 | Yung et al. |
| 2021/0247324 A1 | 8/2021 | Naruse |

OTHER PUBLICATIONS

Extended European Search Report dated Jun. 11, 2024 as received in Application No. 23216374.1.

* cited by examiner

ADAPTATION OF ILLUMINATION SETTINGS FOR OPTICAL MEASUREMENT AND INSPECTION SYSTEMS

BACKGROUND

The present disclosure generally pertains to the field of optical measurement and inspection systems and to optically measuring and inspecting workpieces. More specifically, the disclosure pertains to an automated adaptation of the illumination settings of optical measurement and inspection systems for the improved optical measurement or inspection of workpieces.

Optical measurement machines and optical inspection machines are used in a wide variety of applications in quality management, quality assurance and production. In contrast to tactile measurement technology, optical measurement and inspection processes use light for contact-free measurement or inspection of a test object's properties. This technology makes use of the physical principles of absorption and reflection to capture the properties of whole surfaces and not just individual measuring points.

Optical quality control involves the visual inspection of a workpiece or geometrical features thereof using a camera. Acquired images are used to visually, programmatically, or algorithmically—e.g., using image processing algorithms— detect defects or deviations from nominal dimensions and/or shapes. The quality and exploitability of such recorded images for quality control highly depend on the lighting. Optical inspection and/or measurement machines in general often comprise several lighting elements that can be controlled independently from one another, including different absolute or relative illumination levels for a multitude of lighting elements. These lighting elements may comprise top, back, and front lighting elements, wherein front lighting often includes ring lights that are arranged around the camera used for inspecting the workpiece. Top lighting may comprise a coaxial LED top light, and back lighting may comprise a telecentric LED back light. Both, top and back lighting may be fixedly installed in the optical inspection and/or measurement machine. The front lighting may be movable (e.g., together with the camera) relative to the object to be measured and/or inspected.

Consequently, several top, back and ring-light configurations may be selected depending on the given object, i.e., its geometry with holes and edges and its specific surface properties. Also specific boundary conditions must be taken into consideration when selecting the specific lighting configuration. These boundary conditions include orientations and distances of the one or more cameras, lighting and object features, as well as the setup of the cameras, and stray light from the surrounding environment.

Based on the part geometry, material properties, etc., various light settings will induce various image effects like shadows or reflections. Currently, a manual, stepwise tuning process is required to converge empirically to a satisfying light setting for the purpose of visual inspection. Operator expertise is therefore indispensable, making the overall tedious process unscalable.

SUMMARY

It is therefore an object of the present disclosure to provide an improved method and an improved system that allow finding optimal illumination settings for an optical measurement machine.

It is a particular object to provide such a method and system that allow finding the optimal illumination settings autonomously.

A first aspect pertains to a method for optical inspection of a feature of interest on a workpiece using an optical inspection and/or measuring system comprising at least one camera and a plurality of light sources, the light sources allowing selection of a plurality of different light settings. The method comprises:

inferring, in at least one image captured by the at least one camera, properties of the geometrical feature of interest on the workpiece;

controlling, based at least on the inferred properties, the plurality of light sources to select a light setting for illuminating the feature of interest; and optically inspecting, using the at least one camera, the illuminated feature of interest while the feature of interest is illuminated with the selected light setting.

According to this aspect, the method further comprises simulating illumination of a workpiece model, and training, at least partly based on the simulated illumination, an AI model to automatically control the plurality of light sources. Simulating the illumination of the workpiece model comprises:

providing 3D data of the workpiece model;

approaching a representation of a feature on the workpiece model with at least one virtual camera and a plurality of virtual light sources, wherein the virtual light sources are arranged corresponding to an arrangement of the light sources of the optical measuring system and allow selection of the same plurality of light settings as the light sources of the optical measuring system;

rendering a plurality of base images imaging the representation of the feature from the viewpoint of the virtual camera under a set of specific, pre-defined light settings of the virtual light sources; and obtaining synthetic images for all possible light settings of the virtual light sources by compositing the base images.

According to this aspect, training the AI model is based on the obtained synthetic images, and controlling the plurality of light sources is performed automatically by the trained AI model.

According to some embodiments, the method comprises defining an image quality key performance indicator that measures the adequacy of an image of a feature to be used for optically inspecting said feature. For instance, defining said image quality key performance indicator may comprise deriving the image quality key performance indicator automatically from images.

According to some embodiments, training the AI model comprises a reinforcement-learning loop being used for training a reinforcement learning agent (e.g., one of Deep Q-Network, Proximal Policy Optimization, Advantage Actor-Critic, and Actor-Critic with Experience Replay algorithms). For instance, the reinforcement learning agent may be retrained fully or semi-automatically while controlling the plurality of light sources.

According to some embodiments, defining the image quality key performance indicator comprises deriving the image quality key performance indicator automatically from images and comprises at least one of:

considering brightness and/or contrast around the feature of interest;

measuring a density and/or deviations of contour points detected with an image processing algorithm around a specific region, curve or polygon; and measuring a complexity of contours detected with an image processing algorithm.

According to some embodiments, a single-shot parameter estimation is applied in a supervised-machine-learning framework to directly estimate optimal light settings from an input image acquired with pre-defined light settings. For instance, the AI model may be a classifier or a regressor, e.g., with a Deep Neural Network (DNN) architecture.

According to some embodiments, simulating the illumination of the workpiece model comprises simulating illumination of a plurality of different workpiece models with a plurality of different geometrical features, the different geometrical features differing at least with regard to their shape and with regard to at least one of material, colour, roughness and specularity.

According to some embodiments, the method comprises moving a probe head of the optical measuring system to approach the feature of interest, the probe head comprising the at least one camera and at least a first subset of the plurality of light sources, wherein controlling the plurality of light sources comprises controlling the light sources of the first subset. For instance, the feature of interest may be approached by the probe head for inferring the properties of the feature of interest, and/or for optically inspecting the feature of interest. Also, controlling the plurality of light sources optionally may comprise controlling light sources (of a second subset) that are not comprised by the probe head, that can be controlled individually and that are not movable relative to the workpiece.

According to some embodiments, the feature of interest is approached by the probe head for optically inspecting the feature of interest, wherein training the AI model comprises training to automatically control the movement of the probe head relative to the feature of interest to change a distance and an angle of the probe head relative to the feature of interest, and controlling the plurality of light sources comprises controlling the movement of the probe head relative to the feature of interest automatically by the trained AI model.

According to some embodiments, the first subset of light sources is arranged around the at least one camera in one or more concentric rings, for instance in at least three concentric rings.

According to some embodiments, the plurality of light sources are arranged in at least eight (e.g., twelve or more) individually controllable light groups.

A second aspect pertains to an optical measuring system for optical inspection of a feature of interest on a workpiece, the optical measuring system comprising a training unit and one or more optical measuring devices. Each (or the) optical measuring device comprises a computing unit, at least one camera and a plurality of light sources, the light sources allowing selection of a plurality of different light settings, the computing unit being configured to at least partially control an optical inspection functionality of the optical measuring system for optical inspection of the feature of interest. The training unit is configured to simulate illumination of a workpiece model to obtain synthetic images, to train, based at least partially on the obtained synthetic images, an AI model to automatically control the plurality of light sources, and to provide the trained AI model to the one or more optical measuring devices. Simulating the illumination of the workpiece model comprises:

providing 3D data of the workpiece model;

approaching a representation of a feature on the workpiece model with a virtual camera and a plurality of virtual light sources, wherein the virtual light sources are arranged corresponding to an arrangement of the light sources of the one or more optical measuring devices and allow selection of the same plurality of light settings;

rendering a plurality of base images imaging the representation of the feature from the viewpoint of the virtual camera under a set of specific, pre-defined light settings of the virtual light sources; and obtaining the synthetic images for all possible light settings of the virtual light sources by compositing the base images.

Each (or the) optical measuring device is configured to infer, in at least one image captured by the at least one camera, properties of the feature of interest on the workpiece;

to control, automatically by the trained AI model and based at least on the inferred properties, the plurality of light sources to select a light setting for illuminating the feature of interest; and to optically inspect, using the at least one camera, the illuminated feature of interest while the feature of interest is illuminated with the selected light setting.

According to some embodiments of the optical measuring system, at least one of the one or more optical measuring devices comprises a probe head that is movable relative to the workpiece to approach the feature of interest, the probe head comprising the at least one camera and at least a first subset of the plurality of light sources, wherein controlling the plurality of light sources comprises controlling the light sources of the first subset. For instance, the feature of interest may be approachable by the probe head for inferring the properties of the feature of interest, and/or for optically inspecting the feature of interest. Also, one or more of the optical measuring devices may comprise a second subset of light sources that are not comprised by the probe head, can be controlled individually and are not movable relative to the workpiece. In this case controlling the plurality of light sources may also comprise controlling the light sources of the second subset.

According to some embodiments of the optical measuring system, the first subset of light sources is arranged on the probe head around the at least one camera in one or more concentric rings, for instance in at least three concentric rings. Also, the plurality of light sources may be arranged in at least eight (e.g., at least twelve) individually controllable light groups.

According to some embodiments, the optical measuring system, is configured to perform a method according to the first aspect. The AI model may be a reinforcement learning agent, such as a Deep Q-Network, or a supervised machine learning agent, such as a Deep Neural Network (DNN).

A third aspect pertains to a computer program product comprising program code having computer-executable instructions for performing, in particular when run in a system according to the second aspect, the method according to the first aspect.

BRIEF DESCRIPTION OF THE DRAWINGS

The disclosure in the following will be described in detail by referring to exemplary embodiments that are accompanied by figures, in which.

DETAILED DESCRIPTION

Figure 1:
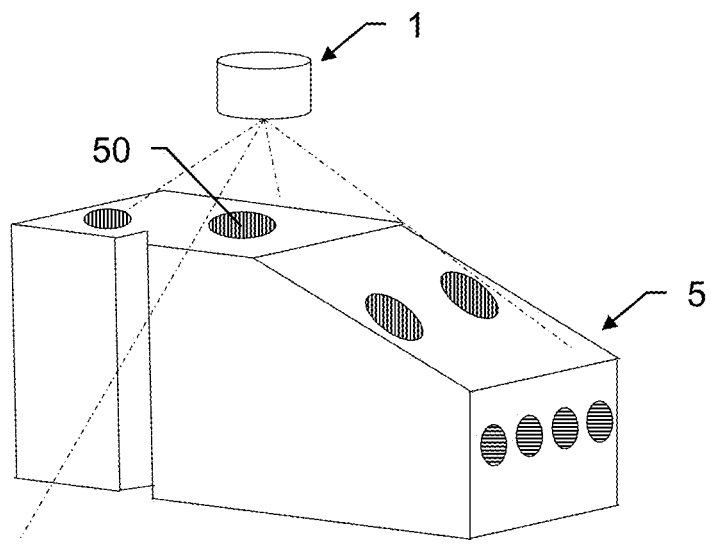
FIG. 1 illustrates the optical inspection of a workpiece by means of an optical probe head of an optical measuring machine.

FIG. 1 shows an example of a workpiece 5 comprising a geometrical feature of interest 50 being optically examined by an optical probe head 1 of an optical measuring machine. The probe head 1 comprises at least one camera and an illuminator for illuminating the workpiece 5 and the feature of interest 50 during the optical examination. The probe head 1 may be movable relative to the workpiece 5 for approaching the feature of interest 50. Preferably, probe head 1 is movable in six degrees-of-freedom (6DOF) to allow inspection of the feature with different distances and angles.

Figure 2:
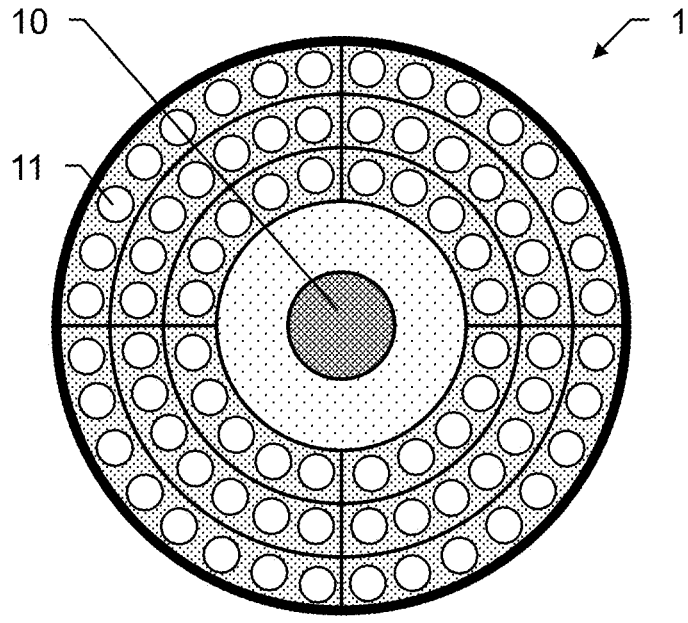
FIG. 2 shows an exemplary embodiment of a probe head of an optical measuring machine comprising a ring-shaped lighting element with a multitude of LEDs.

FIG. 2 shows an example of a probe head 1 used in an optical measuring machine. The camera 10 is provided at the centre of the probe head 1 and surrounded by three concentric rings of light sources 11, e.g., light-emitting diodes (LED). Each ring is divided into four sectors, so that in this particular setup, the intensity levels of twelve ring light sectors can be controlled and tuned individually. In addition, the optical measuring machine may comprise further light sources that can also be controlled and tuned individually, for instance a top and a back light (not shown here).

Of course, other light setup geometries than concentric rings are possible. Also, various light source types or combinations thereof might be used, e.g., different LED types, discharge or fluorescent lamps, as well as halogen lamps. The light sources may provide light with uniform wavelengths, e.g., white light, or provide electromagnetic radiation (light) in different wavelengths, i.e., colours (RGB), and/or infrared (IR) or ultraviolet (UV) radiation.

Another parameter that can be optimized is the exposure. Exposure is basically controlled by lens aperture and duration that light exposes the sensor. Although exposure may be fixed to one level (i.e., E=1) by using only one aperture and shutter configuration of the camera, optionally, various exposure levels may be added to the variables to tune with reinforcement learning, along with the intensity quantization levels of the lights.

If N is the number of tuneable light groups, E the possible number of exposure levels, and Q the number of quantization levels of luminous intensity, there is a total of $T=(E \times Q)^N$ possible light settings, which increases exponentially with N. Assuming a setup where N=14 (i.e. twelve ring sectors and two additional lights for top and back light, respectively), E=1, and where the light intensity can be set between 0% and 100% in steps of 10%, i.e. Q=11, T is approximately 380 trillion, which makes it intractable to exhaustively test all solutions. The present disclosure therefore proposes to automatically infer optimal light settings providing adequate images for subsequent optical quality control without requiring manual intervention.

Figure 3C:
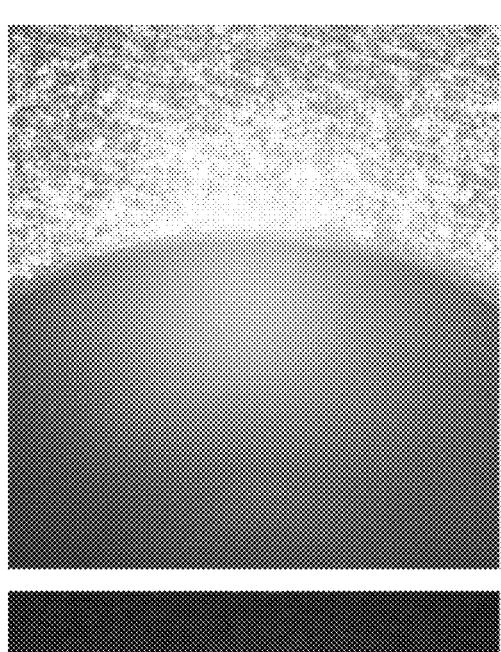
FIGS. 3*a-c* show images of the same circular feature of a workpiece acquired with three different lighting settings.
Figure 3B:
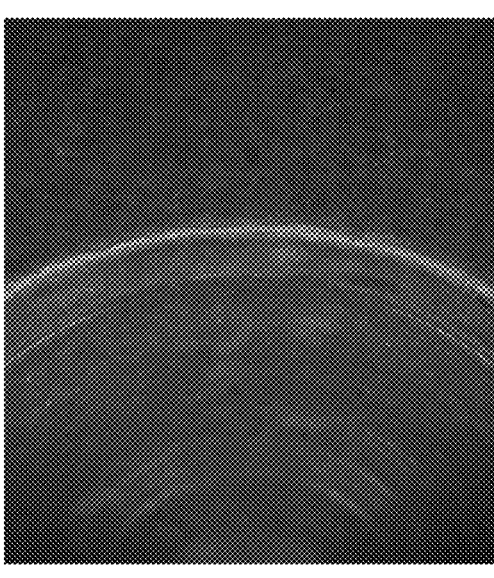
Figure 3A:
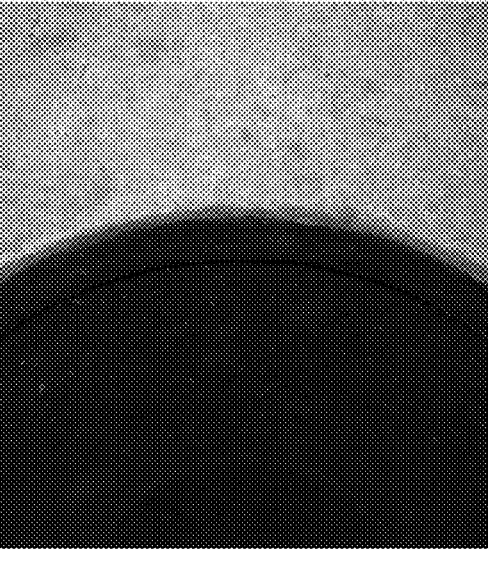

FIGS. 3*a-c* show three images of the same circular feature of a workpiece acquired with different light settings. A typical quality check in manufacturing comprises measuring the diameter of the drilled circular hole and verifying that this dimension falls within tolerance limits. Therefore, if image processing tools—e.g., contour-detection-based algorithms—are used to detect and fit the circle, then light settings must be chosen so as to optimize image quality in the region of the geometrical feature of interest, i.e., to optimize the brightness and contrast.

An AI-based solution is proposed that implicitly leverages object characteristics like geometry, material properties, etc., where the AI-based solution described here comprises a reinforcement learning (RL) framework: In reinforcement learning, an agent learns by interacting with the environment through trial and error and receiving positive or negative rewards as feedback. The agent is an intelligent decision-maker. The environment receives action signals from the agent and returns observation signals back to the agent. The disclosure itself is not limited to RL but also allows implementations using supervised machine learning (SML), and especially neural networks applying deep learning. In the approach using RL, an agent is trained to explore the space of light settings to maximize a total reward according to an image quality key performance indicator (KPI).

Figure 4:
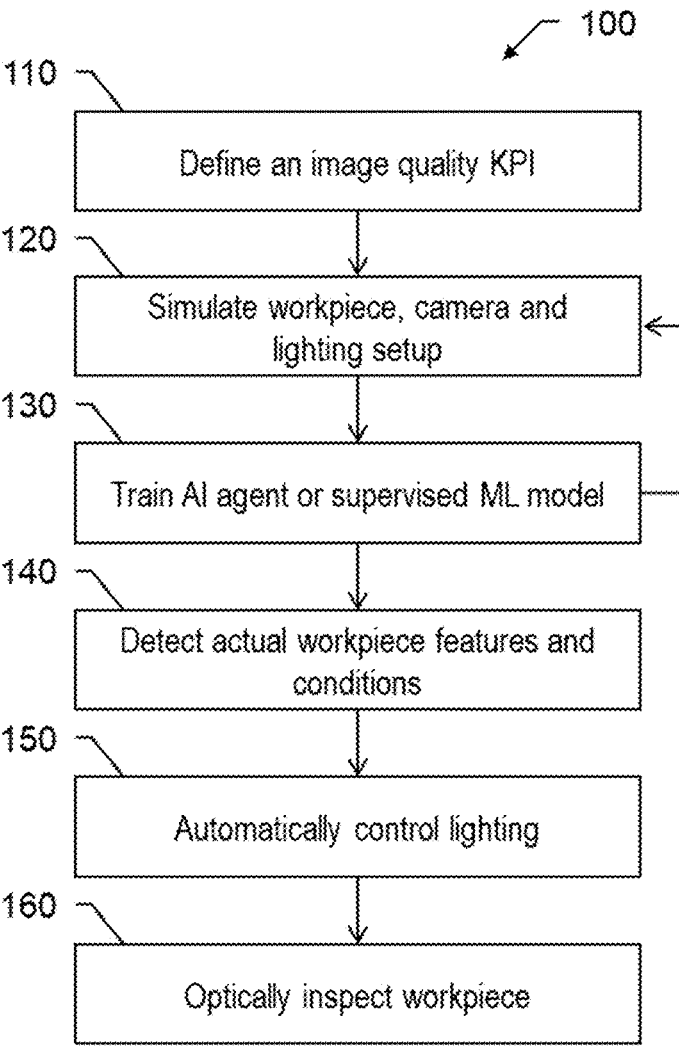
FIG. 4 shows a flowchart illustrating an exemplary embodiment of a method.

FIG. 4 illustrates steps of an exemplary embodiment of a method 100 for optical inspection of a workpiece. In a first step of the method 100, an image quality KPI is defined 110, e.g., as a score. The KPI measures the adequacy of an image to be used for optical quality control. The image quality score is used to steer the overall AI-based approach until convergence to an acceptable value. The KPI can be derived automatically from images in several ways. For instance, this score could:

consider brightness and/or contrast in regions of interest around the geometrical feature to be measured;
   measure the density and/or deviations of contour points detected with an image processing algorithm (such as PC-DMIS of Hexagon Manufacturing Intelligence) around a specific region, curve or polygon;
   measure the complexity of the contours detected with an image processing algorithm (e.g., assuming the measured geometrical features exhibit a low complexity or entropy), where the contour complexity can for instance be computed by a line segment approximation, e.g., using the Ramer-Douglas-Peucker algorithm, followed by the calculation of the number of turning points normalized by the length of the contour line; and/or
   consist of company- and/or metrology application-specific definitions of KPIs.

In a next step, a workpiece model is simulated 120 under various lighting conditions by a simulation engine. The simulation engine, by rendering a multitude of synthetic images, enables the generation of a scalable training dataset for the RL model. By varying the workpieces and geometrical features of interest to cover a large variety of shapes, as well as their material, colour, roughness, specularity, etc. in the simulation engine, a large corpus of examples can be created. For that purpose, the light setup, as well as the camera have to be modelled within the simulation engine. This is described in more detail with respect to FIG. 5 below.

Then, a reinforcement-learning loop (RL loop) is used for training 130 an AI agent. This is described in more detail with respect to FIG. 7 below. Alternatively, based on the data sets of 120, a machine learning (ML) model such as a Deep Neural Network can be trained 130 as described in more detail in FIG. 8. Optionally, training the AI agent or ML model may be partially based on real data (e.g. real images of real workpieces), for instance for fine-tuning.

When the AI agent or ML model has been trained, actual workpieces may be inspected by an optical measuring machine using said AI agent or ML model.

For given geometrical features of interest on the workpiece that need to be inspected using the camera of the optical measuring machine, this includes automatically adapting to the features' material, colour, roughness, specularity, etc., as well as to conditions of the surrounding, e.g., stray light, and conditions of the camera setup 140.

The AI agent or the ML model automatically determines an optimal lighting for the determined features under the detected conditions and controls 150 the lighting of the optical measuring machine accordingly. The optical measuring machine then uses the AI-/ML-selected lighting to optically inspect 160 the features of interest on the workpiece. The AI agent or the ML model can also be continuously retrained and improved on actual data, e.g., involving a human operator in the loop to replace and/or complement the KPI-based reward mechanism and/or to add new data sets to the supervised retraining.

Figures 5A, 5B:
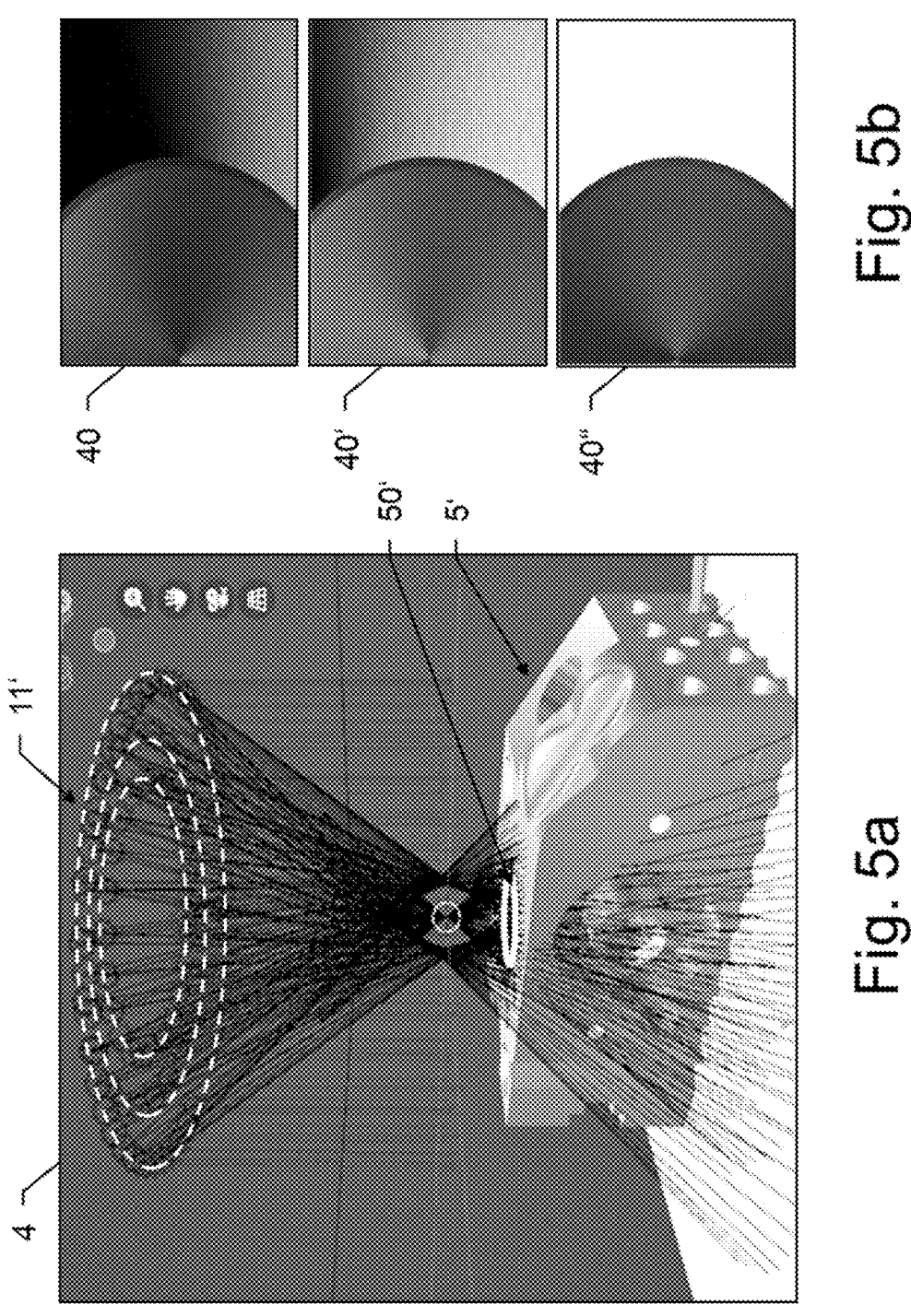
FIG. 5*a* shows a simulation of the 3D workpiece, camera and lighting setup within a simulation engine, used to render synthetic images.
FIG. 5*b* shows synthetic images of the same circular feature of the rendered workpiece model acquired with three different lighting settings.

FIGS. 5a and 5b illustrate the use of a simulation engine for rendering synthetic images of a workpiece as a basis for the AI training (step 120 of the method of FIG. 4). FIG. 5a shows a simulation 4 in the 3D rendering software "Blender", and FIG. 5b shows three images 40, 40', 40" that have been rendered under different light settings using this simulation. The representation 5' of the workpiece in the shown example is a 3D metallic block, comprising representations of various geometrical features, including a representation 50' of a circular hole on top of the workpiece as the feature of interest (indicated here by a white circle). The virtual light sources 11' are arranged as shown in FIG. 2, i.e., in three concentric circles (indicated here by dashed lines). Each of the light sources of this lighting setup is modelled individually, then grouped together into controllable sectors. Also the camera mounted within the optical measurement setup is modelled.

The present disclosure relies on rendering the synthetic images 40, 40', 40" in the simulation engine, which enables the generation of a scalable training dataset for the RL or SML model defined above. By varying the workpieces and features of interest to cover a large variety of shapes, as well as their material, colour, roughness, specularity, etc. in the simulation engine, a large corpus of examples can be created. For that purpose, the light setup, as well as the camera have to be modelled within the simulation engine.

Figure 6:
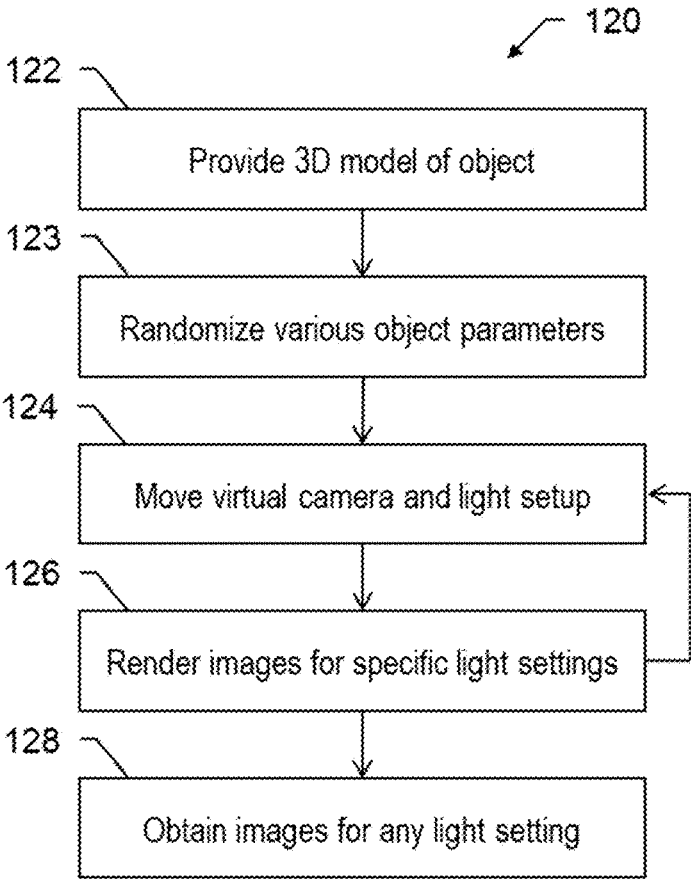
FIG. 6 shows a flowchart illustrating an exemplary process of rendering synthetic images using a workpiece as well as a camera and lighting model, as a part of the method of FIG. 4.

FIG. 6 is a flow chart illustrating an exemplary process of generating synthetic images, thereby leveraging the simulation environment. All of the process steps can be scripted. First, a 3D object with geometrical features to be measured (features of interest) is provided 122. That means the 3D object is either imported, e.g., as a CAD model, or hand-crafted directly within the simulation engine.

Various parameters of the object may be randomized 123. This tuning of object properties within the engine (e.g., material, colour, roughness, specularity, etc.), allows augmentation or diversification of the data.

The virtual camera and light setup can then be moved 124 to visually inspect any specific location on the virtual 3D object. For any configuration of the object properties and locations, as defined above, a set of base images is rendered 126 for a set of specific, pre-defined light settings. Assuming linearity of the imaging system's sensor, an image can be obtained 128 for any illumination pattern by compositing, i.e., superposition of base images. Compositing being a linear operation, images corresponding to given light settings can be computed much faster from base images rather than rendering them from scratch. Optionally, the simulation engine can exploit GPUs for faster rendering of the base images.

Figures 7, 8:
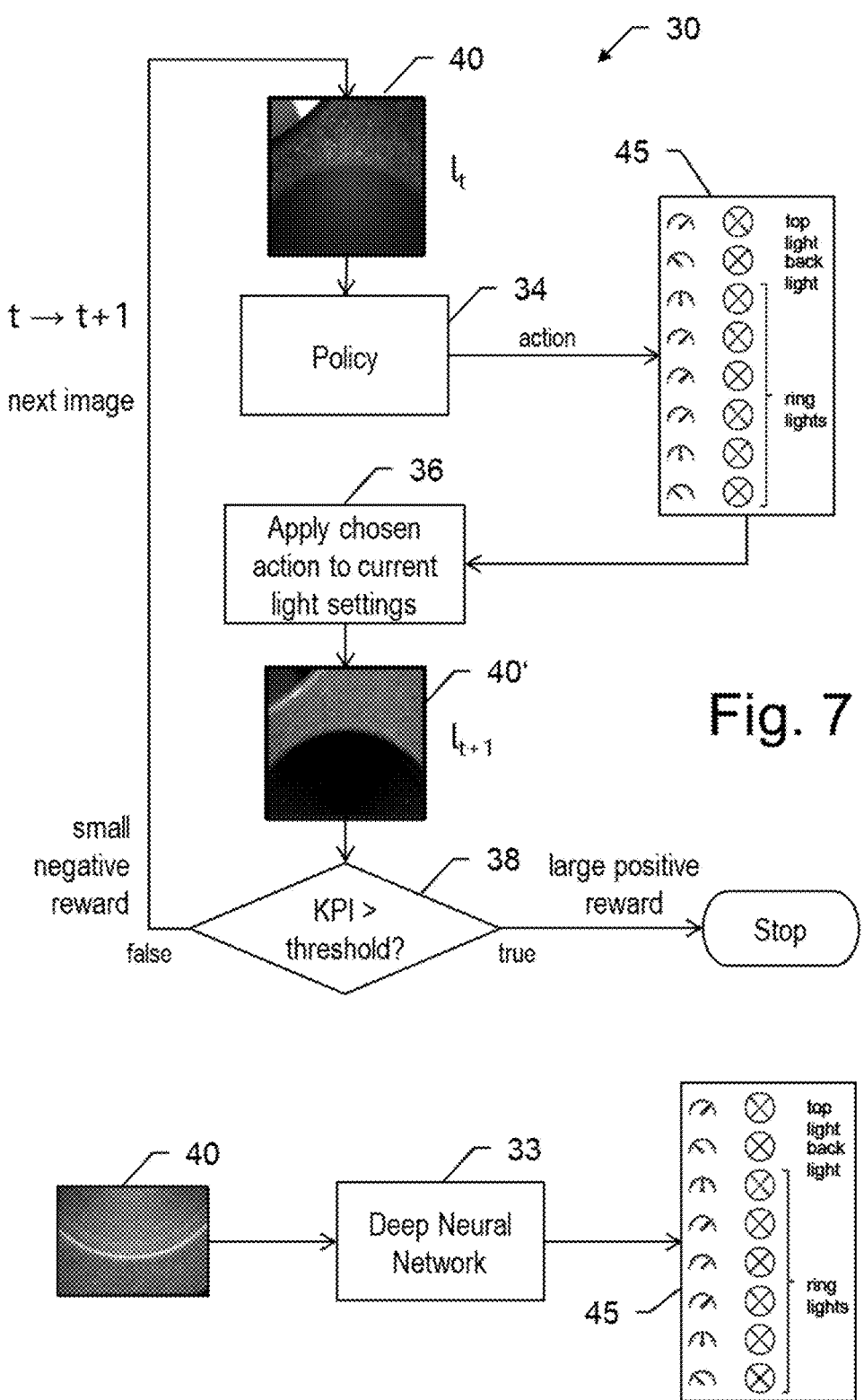
FIG. 7 shows a flowchart illustrating an exemplary reinforcement-learning loop for the training of an AI agent as a part of the method of FIG. 4.
FIG. 8 shows an illustrative embodiment of a system where a deep neural network is used to directly infer the optimal light settings from image features.

FIG. 7 illustrates a reinforcement-learning loop (RL loop 30) of an exemplary method, wherein an AI agent is trained (step 130 of the method of FIG. 4) to recommend appropriate actions, where actions are adjustments of the light intensities within the lighting setup. In the shown RL loop example, the lighting setup comprises eight tuneable light sectors 45 (consisting of six ring light sectors, a top light and a bottom light), and the actions are 5% steps increasing or decreasing the intensity of individual light sectors. The AI agent can thus take sixteen different actions.

The agent and environment continuously interact with each other. At each time step, the agent chooses an action on the environment based on its policy. The policy is a mapping of state to a probability distribution of actions. The chosen action is applied to the environment. During training, the policy balances exploitation, so acting upon what was already learned, and exploration by trying random actions.

The environment returns an observation. This observation is a partial description of the state of the world. It is not complete because it does not include all the relevant information which influences the light setting, e.g., temperature or material properties.

In the shown RL loop 30, several reinforcement learning algorithms could be used, e.g., Deep Q-Network (DQN), Proximal Policy Optimization (PPO), Advantage Actor-Critic (A2C), or Actor-Critic with Experience Replay (ACER).

The environment is the optical inspection system 1 together with the workpiece 5 when applying the agent to the real optical measuring system or the virtual light sources 11' together with the virtual workpiece 5' when applying the agent to the simulation. Image 40 shows the observation of the system at a first point in time $(1_t)$ e.g., a synthetic image rendered by a simulation engine as described above with respect to FIG. 5a. The agent chooses an action, i.e., increasing or decreasing the intensity of one of the tuneable lights or light sectors, according to the policy 34. The chosen action is applied 36 to the current light setting of the light sectors 45, thereby receiving the observation 40' at a second point in time $(1_{t+1})$.

It is then determined 38, whether the KPI of the image 40' with the selected lighting 45 meets or exceeds a predefined threshold, i.e., whether the image quality is sufficient. If the KPI does not reach the threshold, the agent is penalized and the loop 30 is continued, now using the image obtained in the previous iteration 40' as input to the next iteration. The process is repeated until the KPI meets or exceeds the predefined threshold, then a large positive reward is granted, and the loop is abandoned.

The agent learns to behave in the environment by trial and error over a multitude of such episodes. Over time, the agent learns to take actions that maximize its expected reward. The policy is updated based on the agent's past experiences and rewards.

Optionally, additional parameters beyond light intensity levels can be optimized. These additional parameters may comprise a pose of the lighting setup relative to the geometrical feature of interest. For instance, a distance and angle of the measurement setup, i.e., the optical probe head, relative to the workpiece may be adapted. Also, in some embodiments, angles and/or positions of one or more light sources might be adaptable with respect to the other hardware, i.e., the camera and/or the other light sources by means of tilting and/or shifting. The additional parameters may also comprise an on-/off-frequency or a light frequency spectrum (e.g., RGB colour, IR, UV) of the light sources, and exposure levels and other imaging parameters of the camera.

The additional parameters may also comprise effects due to heating up or cooling down of illumination lights, i.e., heat-induced air turbulences or expansions of the lighting system, e.g., of the optical probe head. The additional parameters may also comprise a location or time of the measurement, for instance because of location-specific or time-of-measurement-specific straylight. Basically, any system property that shows significant tool-to-tool variations or that comes with location-/customer-specific individual configurations that might have not been covered in the standard training can be an additional parameter, for instance any effect that causes the camera's images to be underexposed or overexposed.

Advantageously, using this RL framework, no annotation by a human labeller is needed. Contrary to a SML framework, the optimal light settings do not need to be manually defined and recorded for a large corpus of workpieces and features thereof, which would be a tedious task to be conducted by an expert. Instead, the search for an optimal light setting is solely driven by the KPI defined above. Thanks to the parameter space exploration enabled by RL, the proposed algorithm is capable of adapting to conditions not seen during training, thus minimizing the risk of getting stuck in suboptimal solutions. Also, the method does not rely on hand-crafted features describing geometry, material, etc., but simply uses image features as input, which could implicitly encompass such relevant information about the object characteristics.

The RL agent can be trained on experimental data acquired in the laboratory and/or on synthetic data. The same compositing idea can be used when training on real data, too, so that only a handful of base images need to be acquired for any given workpiece and/or geometrical feature thereof. Transfer learning can be applied to fine-tune the model to specific scenarios or environments. In the end, inference can be conducted by applying the optimal learned policy on any new workpiece or feature, regardless of their geometries, materials, etc.

Optionally, the trained agent may have direct access to the program controlling the light settings and directly act upon them following the optimal policy.

Optionally, a set of base images can be acquired in the first place. The adjustments to the light settings suggested by the optimal policy are then reflected as a compositing of these base images. Eventually, the optimal image for visual inspection can also be a composite image obtained as an optimal combination of base images.

An alternative solution relies on a supervised machine learning (SML) framework instead of the RL framework described above. FIG. 8 shows a single-shot light setting estimation using such a framework, e.g., based on a Deep Neural Network (DNN) 33 as the AI model for classification or regression of the light intensities. In this context, single-shot parameter estimation can be applied to directly estimate the optimal lighting parameters 45 from an input image 40 acquired with pre-defined lighting conditions, i.e., a pre-defined default setting of the lights. As in the RL-based approach, this alternative approach would also not require the design of hand-crafted features describing the object geometry, material, etc., as a deep neural network, e.g., a Convolutional Neural Network (CNN) or a Transformer network, would learn to extract relevant image features for the task of light setting prediction.

For instance, based on the input image 40, the SML model, e.g., with the Deep Neural Network (DNN) 33 as the AI model, learns features that are relevant to predict optimization of light intensities. An N-dimensional vector representing the predicted intensities for each light in the setup can then be outputted, which allows estimating the optimal lighting parameters 45. Alternatively, any classical machine learning algorithm for classification and/or regression can be used instead of the DNN.

In contrast to the RL approach, this SML approach would not require the definition of an image quality KPI. Being supervised, however, this alternative approach would need to rely on a large corpus of images and their corresponding hand-labelled optimal light settings selected by an expert.

Compared with the RL approach, the SML approach has a couple of disadvantages, such as a tedious manual annotation. For every workpiece and/or feature thereof in the training database, an expert would need to tune the light settings to reach an optimal solution, then record this ultimate setting as ground truth. Similarly, an expert would also need to tune the light settings in the simulation engine to annotate synthetic images. Also, it is difficult to define a universal pre-defined default light setting to acquire input images, and there is a risk of finding suboptimal solutions, especially for special conditions not seen during training.

However, the SML approach has advantages over the RL approach in situations where for the development of such a solution a large corpus of historically used image parameter settings—incorporating operators' know-how on optimal choice of lighting—would be available together with all other relevant parameters of machine, object geometry and metrology task of interest. Based on scenarios of such a historical data base, the previously described simulation engine could be run with these optimal illumination parameters (label: "optimal, since actually used in the past") and also many other non-optimal illumination parameters (label: "suboptimal, since not used in the past") in order to generate labelled training data spanning a wide range of possible illumination settings for developing and testing SML models.

Both the RL and SML approach optionally may be modified to be semi-automated approaches with manual intervention of the operator. In this case, the operator seeds the process with an educated best guess illumination setting for starting the optimization process. The operator then poses boundary conditions e.g., on the illumination parameters (knowing, e.g., that for a given kind of object and task it is advantageous to use only ring light segments at large angles but not the top light in the centre and also not the backlight, hence turning them off). For instance, this comprises removing them from the optimization run (RL) or setting them after computation (SML) to zero. The operator then ranks a set of candidate illumination settings proposed by the system to manually select and use the optimal one and confirms that a derived illumination setting is usable. The operator manually selects a suitable setting in situations where the AI model does not converge within an acceptable number of iterations below a KPI threshold (RL) or without acceptable confidence (SML). This serves as a fallback, for instance for situations in which certain combinations of object (geometry, material, surface), surrounding lighting conditions and metrology task have not been covered in the training. Optionally, this may also generate labelled data via user feedback that can be used for improving the AI/ML models in re-training runs.

Optionally, the reinforcement learning (RL) agent may be retrained while being used in the final product. For instance, if the model did not perform well on a particular feature, the model could be retrained on this feature fully or semi-automatically so that for later light adaptions, the optimal light setting is found much faster by the RL agent.

Alternatively, instead of a "one-fits-all" model, the implementation could involve machine learning models (RL or SML) that are specific to certain properties of the object or measuring systems or to certain measuring tasks. For instance, regarding specific properties of the measurement object, for bright, shiny surfaces other kinds of models and/or KPIs may be used than for dark, non-reflective surfaces. Regarding metrology tasks of interest, the system may refer to different models when measuring holes, edges or corners. Regarding properties of the system, models can be selected based on the model version, i.e., the generation of the used metrology device. Also, models may be selected based on properties of the camera, e.g., grayscale vs. RGB images. For instance, this model selection may include selecting a model that assumes very low levels of surrounding straylight vs. a model that can deal with or is insensitive to straylight, or selecting a model that converges very fast towards an acceptable lighting setting (which may not be optimal) vs. a model that converges towards a very likely globally optimal lighting (which may take a longer time to find). In some of these cases, a machine-learning based classifier could be decisive to determine which model to use. For example, based upon the camera's image and/or information about the measurement object available in the metrology SW, a simple binary classifier (implemented e.g., as decision tree, support vector machine or neural network) could discriminate between the cases of "use the model for bright objects" vs. "use the model for dark objects".

Figure 9:
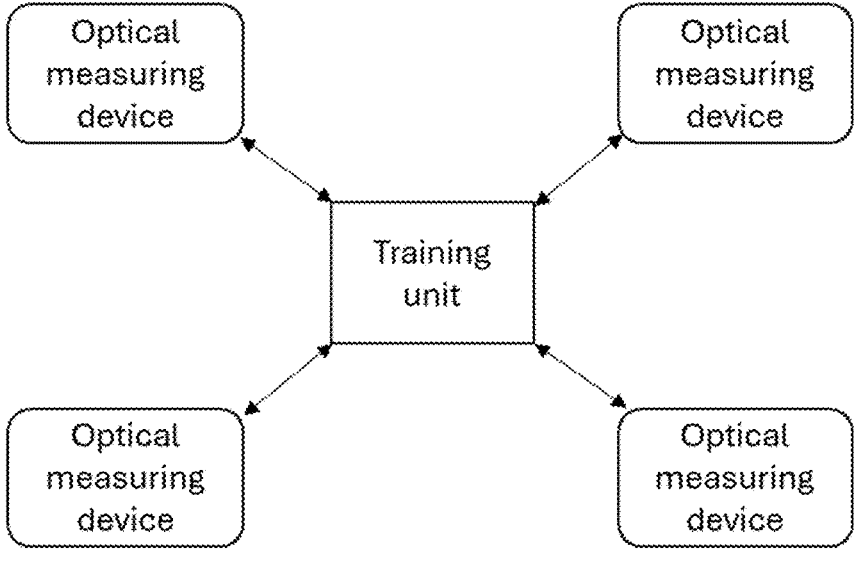
FIG. 9 shows an illustrative embodiment of an optical measuring system.

FIG. 9 shows an example of an optical measuring system. The system comprises at least one training unit and one or more optical measuring devices. Each optical measuring device comprises a computing unit, at least one camera and a plurality of light sources that allow selection of a plurality of different light settings. The computing unit is configured to at least partially control an optical inspection functionality of the optical measuring system for optical inspection of the feature of interest, for instance according to the method described above. The training unit is configured to simulate illumination of a workpiece model to obtain synthetic images, and to train, based thereon, an AI agent or ML model to automatically control the light sources of the devices, for instance according to the method described above. The trained AI agent or ML model is then provided to the devices.

The training unit may be a remote system. It may train global AI agents/ML models using simulations (and optionally fine-tuning on real data), for each specific device/hardware setup, and optionally also for the specific conditions at the location of the specific device (e.g., bright vs. dark objects, stray light vs. no stray light). The AI agents/ML models can be updated and versioned, and made available, e.g., as a cloud service. Alternatively, the training unit may be provided locally, e.g., as a part of an optical measuring device.

Optical measuring devices are local systems that apply the global AI agents/ML models according to their specific setup. Optionally, they may record feedback from the user (e.g., human evaluation of AI agent outcomes or labelled data comprising 3D object information and optimal human-defined light settings) for tailored retraining and/or customization. The retraining itself could either take place locally (thus benefitting the user of the specific device) or remotely (and potentially be integrated into the global AI models to benefit a larger community).

Although aspects are illustrated above, partly with reference to some preferred embodiments, it must be understood that numerous modifications and combinations of different features of the embodiments can be made. All of these modifications lie within the scope of the appended claims.

The invention claimed is:

1. An optical measuring system for optical inspection of a feature of interest on a workpiece, the optical measuring system comprising a training unit and one or more optical measuring devices, each optical measuring device comprising a computing unit, at least one camera and a plurality of light sources, the light sources allowing selection of a plurality of different light settings, the computing unit being configured to at least partially control an optical inspection functionality of the optical measuring system for optical inspection of the feature of interest, wherein the training unit is configured to:
  simulate illumination of a workpiece model to obtain synthetic images;
  train, based at least partially on the obtained synthetic images, an artificial-intelligence model to automatically control the plurality of light sources; and
  provide the artificial-intelligence model to the one or more optical measuring devices,
wherein simulating the illumination of the workpiece model comprises:
  providing 3D data of the workpiece model;
  approaching a representation of a feature on the workpiece model with a virtual camera and a plurality of virtual light sources, wherein the virtual light sources are arranged corresponding to an arrangement of the light sources of one or more of the optical measuring devices and allow selection of the same plurality of light settings as these light sources;
  rendering a plurality of base images imaging the representation of the feature from the viewpoint of the virtual camera under a set of specific, pre-defined light settings of the virtual light sources; and
  obtaining the synthetic images for all possible light settings of the virtual light sources by compositing the base images,
wherein each of the one or more optical measuring devices is configured to:
  infer, in at least one image captured by the at least one camera, properties of the feature of interest on the workpiece;

control, automatically by the trained artificial-intelligence model and based at least on the inferred properties, the plurality of light sources to select a light setting for illuminating the feature of interest; and optically inspect, using the at least one camera, the illuminated feature of interest while the feature of interest is illuminated with the selected light setting.

2. The optical measuring system according to claim 1, wherein at least one of the one or more optical measuring devices comprises a probe head that is movable relative to the workpiece to approach the feature of interest, the probe head comprising the at least one camera and at least a first subset of the plurality of light sources, wherein controlling the plurality of light sources comprises controlling the light sources of the first subset, particularly wherein the feature of interest is approachable by the probe head for inferring the properties of the feature of interest, and/or for optically inspecting the feature of interest; and/or one or more of the optical measuring devices comprise a second subset of light sources that are not comprised by the probe head, can be controlled individually and are not movable relative to the workpiece, wherein controlling the plurality of light sources comprises controlling the light sources of the second subset.

3. The optical measuring system according to claim 2, wherein:

the first subset of light sources is arranged on the probe head around the at least one camera in one or more concentric rings, particularly in at least three concentric rings; and/or the plurality of light sources are arranged in at least eight, particularly at least twelve, individually controllable light groups.

4. The optical measuring system according to claim 1, wherein the artificial-intelligence model is a reinforcement learning agent or a supervised machine learning agent.

5. The optical measuring system according to claim 1, wherein the artificial-intelligence model is a Deep Q-Network or a Deep Neural Network.

6. A method for optical inspection of a feature of interest on a workpiece using an optical inspection and/or measuring system comprising at least one camera and a plurality of light sources, the light sources allowing selection of a plurality of different light settings, the method comprising:

inferring, in at least one image captured by the at least one camera, properties of the geometrical feature of interest on the workpiece;

controlling, based at least on the inferred properties, the plurality of light sources to select a light setting for illuminating the feature of interest; and optically inspecting, using the at least one camera, the illuminated feature of interest while the feature of interest is illuminated with the selected light setting, simulating illumination of a workpiece model; and training, at least partly based on the simulated illumination, an artificial-intelligence model to automatically control the plurality of light sources, wherein simulating the illumination of the workpiece model comprises providing 3D data of the workpiece model;

approaching a representation of a feature on the workpiece model with at least one virtual camera and a plurality of virtual light sources, wherein the virtual light sources are arranged corresponding to an arrangement of the light sources of the optical measuring system and allow selection of the same plurality of light settings as the light sources of the optical measuring system;

rendering a plurality of base images imaging the representation of the feature from the viewpoint of the virtual camera under a set of specific, pre-defined light settings of the virtual light sources; and obtaining synthetic images for all possible light settings of the virtual light sources by compositing the base images, wherein training the artificial-intelligence model is based on the obtained synthetic images, and controlling the plurality of light sources is performed automatically by the trained artificial-intelligence model.

7. The method according to claim 6, comprising defining an image quality key performance indicator that measures the adequacy of an image of a feature to be used for optically inspecting said feature, particularly wherein defining the image quality key performance indicator comprises deriving the image quality key performance indicator automatically from images.

8. The method according to claim 7, wherein training the artificial-intelligence model comprises a reinforcement-learning loop being used for training a reinforcement learning agent, particularly using one of Deep Q-Network, Proximal Policy Optimization, Advantage Actor-Critic, and Actor-Critic with Experience Replay algorithms, in particular wherein the reinforcement learning agent, while controlling the plurality of light sources, is being retrained fully or semi-automatically.

9. The method according to claim 7, wherein defining the image quality key performance indicator comprises deriving the image quality key performance indicator automatically from images and comprises:

considering brightness and/or contrast around the feature of interest;

measuring a density and/or deviations of contour points detected with an image processing algorithm around a specific region, curve or polygon; and/or measuring a complexity of contours detected with an image processing algorithm.

10. The method according to claim 6, wherein a single-shot parameter estimation is applied in a supervised-machine-learning framework to directly estimate optimal light settings from an input image acquired with pre-defined light settings, particularly wherein the artificial-intelligence model is a classifier or a regressor, particularly with a Deep Neural Network architecture.

11. The method according to claim 6, wherein simulating the illumination of the workpiece model comprises simulating illumination of a plurality of different workpiece models with a plurality of different geometrical features, the different geometrical features differing at least with regard to their shape and with regard to at least one of material, colour, roughness and specularity.

12. The method according to claim 6, comprising moving a probe head of the optical measuring system to approach the feature of interest, the probe head comprising the at least one camera and at least a first subset of the plurality of light sources, wherein controlling the plurality of light sources comprises controlling the light sources of the first subset, particularly wherein:

the feature of interest is approached by the probe head for inferring the properties of the feature of interest, and/or for optically inspecting the feature of interest; and/or controlling the plurality of light sources comprises con-
trolling light sources that are part of a second subset,
wherein the light sources of the second subset
are not comprised by the probe head,
can be controlled individually and
are not movable relative to the workpiece.

13. The method according to claim 12, wherein the feature
of interest is approached by the probe head for optically
inspecting the feature of interest, wherein:

training the artificial-intelligence model comprises train-
ing to automatically control the movement of the probe
head relative to the feature of interest to change a
distance and an angle of the probe head relative to the
feature of interest, and controlling the plurality of light sources comprises con-
trolling the movement of the probe head relative to the
feature of interest automatically by the trained artifi-
cial-intelligence model.

14. The method according to claim 12, wherein the first
subset of light sources is arranged around the at least one
camera in one or more concentric rings, particularly in at
least three concentric rings.

15. The method according to claim 6, wherein the plu-
rality of light sources are arranged in at least eight, particu-
larly at least twelve, individually controllable light groups.

16. A computer program product comprising program
code stored in a non-transitory machine-readable medium
having computer-executable instructions for performing,
when run in a system, the method according to claim 6.

17. A computer program product comprising program
code stored in a non-transitory machine-readable medium
having computer-executable instructions for performing,
when run in a system, the method according to claim 15.

* * * * *